United States Patent
Oetjen

[19]

[11] Patent Number: 6,053,063
[45] Date of Patent: Apr. 25, 2000

[54] WORM DRIVE WITH A ROLLER RING NUT

[75] Inventor: Jürgen Oetjen, Herzogenaurach, Germany

[73] Assignee: INA Walzlager Schaeffler oHG, Herzogenaurach, Germany

[21] Appl. No.: 08/983,104

[22] PCT Filed: Jul. 13, 1996

[86] PCT No.: PCT/EP96/03081

§ 371 Date: Jan. 15, 1998

§ 102(e) Date: Jan. 15, 1998

[87] PCT Pub. No.: WO97/06373

PCT Pub. Date: Feb. 20, 1997

[30] Foreign Application Priority Data

Aug. 8, 1995 [DE] Germany ............... 195 29 037

[51] Int. Cl.⁷ ............... F16H 27/02; F16H 1/18; F16H 55/17
[52] U.S. Cl. ............... 74/89.15; 74/424.8 R; 74/459
[58] Field of Search ............... 74/89.14, 89.15, 74/424.8 R, 459

[56] References Cited

U.S. PATENT DOCUMENTS

| | | | |
|---|---|---|---|
| 2,556,572 | 6/1951 | Brinkhurst | 74/424.8 R |
| 3,975,968 | 8/1976 | Chaffin | 74/424.8 R X |
| 4,743,493 | 5/1988 | Sioshansi et al. | 428/217 |
| 4,887,479 | 12/1989 | Griffey | 74/424.8 B X |
| 4,921,403 | 5/1990 | Poucher et al. | 416/147 |

FOREIGN PATENT DOCUMENTS 0 122 596 A1  10/1984  European Pat. Off.
2 277 788  11/1994  United Kingdom.

*Primary Examiner*—David A. Bucci
*Assistant Examiner*—Brandon C. Stallman
*Attorney, Agent, or Firm*—Volpe and Koenig, P.C.

[57] ABSTRACT

A worm gear for transforming a rotary motion into a reciprocating (linear) motion comprises a threaded spindle (2) which is mounted for rotation in a gear ring nut (1), a profiled gear ring (5) engaging into a screw thread of the threaded spindle at one peripheral point. The gear ring (5) surrounds the threaded spindle (2), is arranged eccentric to the spindle axis (3) and fixed on an inner ring (8) of a ball bearing (10) surrounding the gear ring (5). The invention provides that, within the gear ring nut (1), the bearings (4) for rotatably mounting the threaded spindle (2) abut against both end faces of the gear ring (5). This results in an easy-to-mount worm gear with a simplified structure.

10 Claims, 1 Drawing Sheet

WORM DRIVE WITH A ROLLER RING NUT

BACKGROUND OF THE INVENTION

The invention concerns a worm gear for transforming a rotary motion into a reciprocating (linear) motion, comprising a threaded spindle which is mounted for rotation in a gear ring nut, a profiled gear ring engaging into a screw thread of the threaded spindle at one peripheral point, which gear ring surrounds the threaded spindle, is arranged eccentric to a spindle axis and fixed on an inner ring of a ball bearing which surrounds the gear ring.

A worm gear of this type is known from EP-PS 0 122 596 and comprises two gear rings with ball bearings whose outer rings are arranged in special rolling bearing receiving elements within a housing. The gear rings surround the threaded spindle. The bearings which serve as a radial support for the gear ring nut on the threaded spindle are needle bearings. The necessity of using a housing and arranging the ball bearings and the rolling bearing receiving elements in the housing results in a structure which is rather complicated on the whole.

SUMMARY OF THE INVENTION

The object of the invention is to create an easy-to-mount worm gear with a simplified structure.

The invention achieves this object by the fact that, within the gear ring nut, bearings for rotatably mounting the threaded spindle abut against both end faces of the gear ring which are situated within the gear ring nut. Thus, the ball bearing which surrounds the gear ring is not arranged in a housing but, rather, the inner ring of the ball bearing can be slipped axially onto the gear ring nut and retained there by two locking rings which engage into outer peripheral grooves of the gear ring nut. By these measures, the overall dimensions of the worm gear and its manufacturing costs are substantially reduced.

The threaded spindle can be mounted for rotation in the gear ring nut with needle bearings. Both the needle bearings which support the gear ring nut in radial direction on the threaded spindle can be mounted directly in the gear ring nut which can comprise special axial bores starting from its end faces for receiving the needle bearings. The implementation of this embodiment is possible using three standard rolling bearings, viz., the ball bearing for the gear ring and the two needle bearings for the threaded spindle.

However, it is also possible to use sliding bearings in place of the needle bearings for rotatably mounting the threaded spindle in the gear ring nut. Such an embodiment is suitable for use with small spindle diameters under 8 mm and low spindle forces under 100 N. The gear ring nut is then shorter and cheaper. The sliding bearings can be made, for example, of a sintered bronze. The gear ring nut and the gear ring can be made of a polymeric material or of a metallic material such as a bronze.

A further embodiment of the worm gear is characterized in that the gear ring nut, the gear ring and the inner ring of the ball bearing are made together as a one-piece component which can be a hardened steel component. In this case, the gear ring nut is integral not only to the gear ring but also to the inner ring of the ball bearing so that a further reduction of manufacturing costs is achieved.

An additional pre-stress of the gear ring can be obtained by making two separate profiled sections on the bore of the gear ring and arranging them at a slight distance to each other in axial direction. This distance can correspond to the displacement path resulting from the pre-stress.

BRIEF DESCRIPTION OF THE DRAWINGS

Examples of embodiment of the invention are represented in the drawings and will be described more closely below. The drawings show.

DETAILED DESCRIPTION OF THE DRAWINGS

Figure 1:
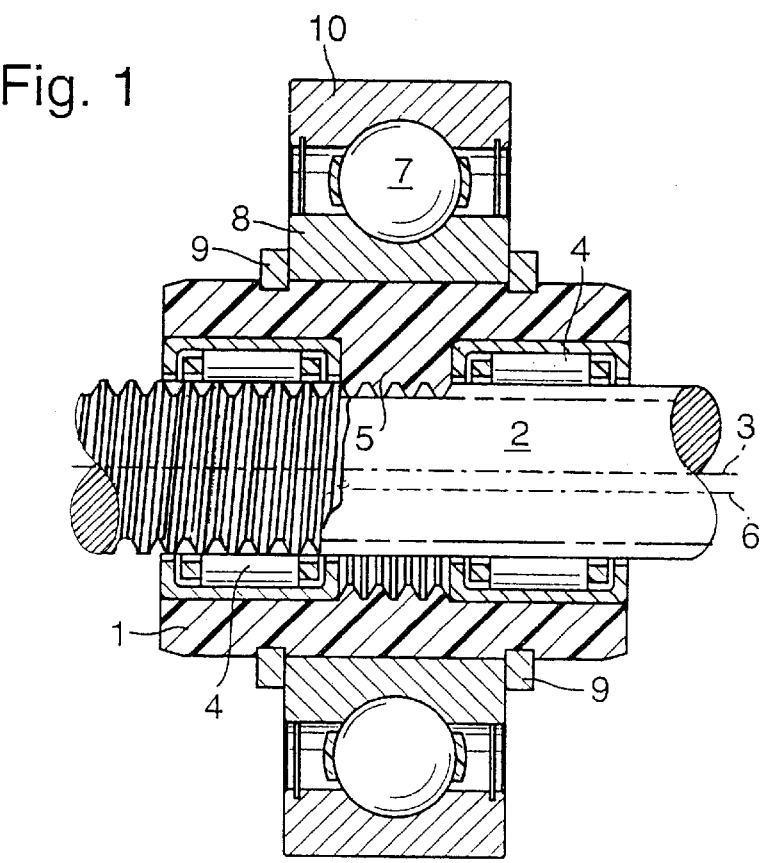
FIG. 1, a longitudinal section through a worm gear in which the gear ring and the gear ring nut are made together as a one-piece component.

A worm gear of the invention shown in FIG. 1 comprises a gear ring nut 1 which surrounds a threaded spindle 2 by which it is displaced in axial direction upon rotation thereof about the spindle axis 3. The threaded spindle 2 is mounted for rotation in the gear ring nut 1 via two needle bearings 4. A profiled gear ring 5 is formed on the inner surface of the gear ring nut 1. The gear ring 5 surrounds the threaded spindle 2 with whose thread it meshes at one peripheral point. The gear ring 5 has a larger inner diameter than the outer diameter of the threaded spindle 2 and is arranged eccentric to the threaded spindle. The axis 6 of the gear ring 5 extends parallel to the spindle axis 3 at a distance therefrom. As a result of the rotation of the threaded spindle 2 about the spindle axis 3, the gear ring 5 is also forced to rotate about this axis because it is in contact with the threaded spindle at one peripheral point and moves on the periphery thereof by rolling. Due to this contact along the thread of the spindle, the gear ring 5, and with it the gear ring nut 1, is not only rotated about the threaded spindle 2 but also displaced in an axial direction thereof.

A ball bearing 7 is pushed with its inner ring 8 onto the outer surface of the gear ring nut 1 and fixed there axially by locking rings 9 abutting against its end faces and engaging partly into peripheral grooves of the gear ring nut 1. The fixing of the inner ring 8 on the gear ring nut I in peripheral direction can be effected by a suitable means, not shown in the drawing.

The outer ring 10 of the ball bearing 7 is intended to be fixed on a connecting structure, not shown, which is to be displaced linearly by rotation of the threaded spindle 2. The ball bearing 7 therefore accomplishes that only the linear, axial component of the spiral movement caused by the threaded spindle 2 in the gear ring 5, the gear ring nut 1 and the inner ring 8 is transmitted to the outer ring 10.

Figure 2:
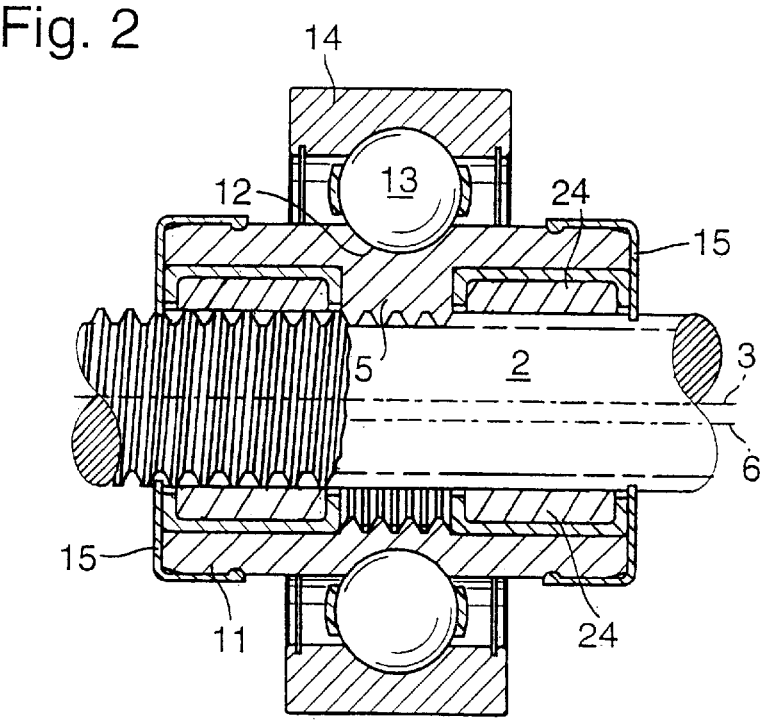
FIG. 2, a longitudinal section through a further worm gear in which the gear ring, the gear ring nut and the inner ring of the ball bearing are made together as a one-piece component.

The worm gear of the invention shown in FIG. 2 has basically the same structure and the same mode of operation as the gear of FIG. 1. In the embodiment of FIG. 2, the gear ring 5 is formed integrally on the gear ring nut 11 which also comprises the inner ring 12 of the ball bearing 13. In this case too, the connecting structure, not shown, which has to be moved linearly, is fixed on the outer ring 14 of the ball bearing 13. Wipers 15 attached to the end faces of the gear ring nut 11 prevent the penetration of dirt particles into the worm gear and retain the lubricant therein.

As shown in FIG. 2, two sliding bearings 24 may be used in place of the needle bearings 4.

The worm gears of the invention have the following advantages in respect of lubrication: Due to the eccentric arrangement of the gear ring 5, a spacious lubricant chamber is formed between the threaded spindle 2 and the gear ring nut 1, 11 opposite the loaded zone of the gear ring 5. This chamber is closed at both ends by the two adjoining needle bearings 4 or by sliding bearings, as the case may be. Thus, less lubricant is lost during operation of the worm gear so that a longer lubricating interval can be obtained.

What is claimed is:

1. A worm gear for transforming a rotary motion into a linear reciprocating motion, comprising a threaded spindle and a profiled gear ring engaging into a screw thread of the threaded spindle at one peripheral point, said gear ring surrounds the threaded spindle, is arranged eccentric to a spindle axis and fixed on a ball bearing which surrounds the gear ring, wherein the gear ring is formed on an inner surface of a gear ring nut, the threaded spindle is mounted for rotation within the gear ring nut, and bearings for rotatably mounting the threaded spindle abut against both end faces of the gear ring and are situated within the gear ring nut.

2. A worm gear of claim 1, wherein the threaded spindle (2) is mounted for rotation in the gear ring nut (1, 11) with needle bearings (4).

3. A worm gear of claim 1, wherein the threaded spindle (2) is mounted for rotation in the gear ring nut with sliding bearings.

4. A worm gear of claim 1, wherein the gear ring nut (1, 11) and the gear ring (5) are made together as a one-piece component.

5. A worm gear of claim 1, wherein the inner ring (8) of the ball bearing (7) is pushed axially onto the gear ring nut (1) and retained there by two locking rings (9) which engage into outer peripheral grooves of the gear ring nut (1).

6. A worm gear of claim 1, wherein the gear ring nut (11), the gear ring (5) and the inner ring (12) of the ball bearing (13) are made together as a one-piece component.

7. A worm gear of claim 1, wherein the gear ring nut (1, 11) and the gear ring (5) are made of a polymeric material.

8. A worm gear of claim 7, wherein the gear ring nut (1, 11), the gear ring (5) and the ball bearing (7) are made of a polymeric material.

9. A worm gear of claim 1, wherein the gear ring nut (1, 11) and the gear ring (5) are made of a metallic material.

10. A worm gear of claim 6, wherein gear ring nut (11), the gear ring (5) and the inner ring (12) of the ball bearing (13) are made as a hardened steel component.

* * * * *